United States Patent [19]

Rozell

[11] 4,115,852
[45] Sep. 19, 1978

[54] MICROPROGRAMMED CONTROLLER

[75] Inventor: James O. Rozell, Richardson, Tex.

[73] Assignee: Harris Data Communications, Inc., Dallas, Tex.

[21] Appl. No.: 748,179

[22] Filed: Dec. 7, 1976

[51] Int. Cl.² .............................................. G06F 9/16
[52] U.S. Cl. .................................................. 364/200
[58] Field of Search ... 364/200 MS File, 900 MS File

[56] References Cited

U.S. PATENT DOCUMENTS

| 3,673,575 | 6/1972 | Burton et al. | 364/200 |
|---|---|---|---|
| 3,810,118 | 5/1974 | Kiffmeyer | 364/200 |
| 3,931,615 | 1/1976 | Oliver et al. | 364/900 |
| 3,950,735 | 4/1976 | Patel | 364/200 |
| 3,972,030 | 7/1976 | Bailey, Jr. | 364/200 |
| 4,025,906 | 5/1977 | Riikonen | 364/200 |

Primary Examiner—Leo H. Boudreau
Attorney, Agent, or Firm—Craig & Antonelli

[57] ABSTRACT

A microprogrammed controller for interconnection between a central processor unit and at least one peripheral unit for controlling the transfer of data therebetween in response to instructions from the central processor unit provides for simplified bit manipulation through a feedback circuit which feeds the data to be supplied to the peripheral unit back to the input bus of the controller for further processing. In this way bit manipulation can be accomplished with a single microinstruction to provide for higher speed and efficiency of operation.

28 Claims, 8 Drawing Figures

FIG. 3.

MICROINSTRUCTION

| 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|
| 0 | 0 | 0 | 0 | 0 | 0 | 0 | | R1 | | | | R2 | | | | MOVE 1 |
| 0 | 0 | 0 | 0 | 0 | 0 | 1 | | R1 | | | | R2 | | | | MOVE 2 |
| 0 | 0 | 0 | 0 | 0 | 1 | 0 | | R1 | | | | R2 | | | | AND |
| 0 | 0 | 0 | 0 | 0 | 1 | 1 | | R1 | | | | R2 | | | | OR |
| 0 | 0 | 0 | 0 | 1 | 0 | 0 | | R1 | | | | R2 | | | | XOR |
| 0 | 0 | 0 | 0 | 1 | 0 | 1 | | R1 | | | | R2 | | | | ADD |
| 0 | 0 | 0 | 0 | 1 | 1 | 0 | | R1 | | | | R2 | | | | SUB |
| 0 | 0 | 0 | 0 | 1 | 1 | 1 | X | X | X | X | | R2 | | | | ROTATE LEFT ONE BIT |
| 0 | 0 | 0 | 1 | 0 | 0 | 0 | X | M2 | M1 | M0 | | R2 | | | | SET BIT |
| 0 | 0 | 0 | 1 | 0 | 0 | 1 | X | M2 | M1 | M0 | | R2 | | | | RESET BIT |
| 0 | 0 | 0 | 1 | 0 | 1 | 0 | | | | | | | | | | NOT USED |
| 0 | 0 | 0 | 1 | 0 | 1 | 1 | | | | | | | | | | NOT USED |
| 0 | 0 | 0 | 1 | 1 | 0 | 0 | X | X | X | X | | R2 | | | | JUMP RELATIVE |
| 0 | 0 | 0 | 1 | 1 | 0 | 1 | A8 | A7 | A6 | A5 | A4 | A3 | A2 | A1 | A0 | JUMP DIRECT |
| 0 | 0 | 0 | 1 | 1 | 1 | 0 | A8 | A7 | A6 | A5 | A4 | A3 | A2 | A1 | A0 | JUMP TO SUBROUTINE |
| 0 | 0 | 0 | 1 | 1 | 1 | 1 | | | | | | | | | | RETURN |
| 0 | 0 | 1 | K7 | K6 | K5 | K4 | K3 | K2 | K1 | K0 | | R2 | | | | MOVE CONSTANT |
| 0 | 1 | 0 | K7 | K6 | K5 | K4 | K3 | K2 | K1 | K0 | | R2 | | | | MATCH/SKIP |
| 0 | 1 | 1 | 0 | A6 | A5 | A4 | A3 | A2 | A1 | A0 | | R2 | | | | ZERO REGISTER TEST |
| 0 | 1 | 1 | 1 | A6 | A5 | A4 | A3 | A2 | A1 | A0 | | R2 | | | | NON-ZERO REGISTER TEST |
| 1 | 0 | A5 | A4 | A3 | A2 | A1 | A0 | M2 | M1 | M0 | | R2 | | | | ZERO BIT TEST |
| 1 | 1 | A5 | A4 | A3 | A2 | A1 | A0 | M2 | M1 | M0 | | R2 | | | | NON-ZERO BIT TEST |

|  | A ∧ B | A ∨ B | A ⊻ B | A + B | A − B | A + A | A ∧ B̄ | A ∨ B̄ | A | B |

| C1/C6 | S3/C5 | S2/C4 | S1/C3 | S0/C2 | M/C1 |
|---|---|---|---|---|---|
| 0 | 1 | 0 | 1 | 1 | 1 |
| 0 | 1 | 1 | 1 | 0 | 1 |
| 0 | 0 | 1 | 1 | 0 | 1 |
| 0 | 1 | 0 | 0 | 1 | 0 |
| 1 | 0 | 1 | 1 | 0 | 0 |
| 0 | 1 | 1 | 0 | 0 | 0 |
| 0 | 0 | 1 | 1 | 1 | 1 |
| 0 | 1 | 1 | 0 | 1 | 1 |
| 0 | 1 | 1 | 1 | 1 | 1 |
| 0 | 1 | 0 | 1 | 0 | 1 |

∨ = LOGICAL OR
∧ = LOGICAL AND
⊻ = EXCLUSIVE OR
+ = ARITHMETIC ADDITION
− = ARITHMETIC SUBTRACTION

|  | C15 | C14 |
|---|---|---|
| I16 | 0 | 0 |
| I8O:7 | 0 | 1 |
| I5:11 | 1 | 0 |
| I8:13 | 1 | 1 |

MICROPROGRAMMED CONTROLLER

The present invention provides an alternative to microprocessors and microcontrollers in the field of computer controlled systems, and more particularly, to a microprogrammed controller, made up of conventional small scale integrated and medium scale integrated devices, and which may be used to implement programmed logic in peripheral controllers, peripheral/CPU interfaces, or special purpose logic designs.

The signals that tie together logic subsystems, such as central processing units (CPU), peripheral controllers, etc., can be broadly classified as either control signals or data signals. Even though the data signals may at times carry control information, their normal function is as numerical or symbolic data and they are normally processed in groups, i.e., bytes or words; whereas, the control signals are normally operated on as single bits. Certainly, control signals may be grouped together to provide control information in an encoded format, but they are seldom processed internally in the same manner as data.

Grouping the input/output signals of a logic subsystem into data signals and control signals provides a convenient means of dividing logic subsystems into respective functional groups. The first group, represented by processors and some special purpose designs, is characterized by the fact that the majority of the functional power of the design is spent processing data signals and a lesser amount of power is spent manipulating control signals. The second group, represented by peripheral device controllers, CPU/peripheral interfaces, and most special purpose designs, is characterized by the fact that the majority of the functional power of the design is spent manipulating control signals and a lesser amount of power, if any at all, is spent processing data signals.

The first of the abovementioned group of logic subsystems, i.e., those providing processor functions, have received much emphasis in recent years, which has led to the latest development in the state of the art — microprocessors and microcontrollers. Microprocessors are optimized in design for processor functions, not the controller functions of the second group of logic subsystems. However, such microprocessors and microcontrollers may be characterized by the fact that they are implemented on one or more large scale integrated (LSI) chips, with the result that they are generally of small size and for complex systems can be provided at relatively low cost.

The second of the abovementioned groups of logic subsystems, i.e., those providing peripheral control and interface, have not achieved the same advantages of small size and low cost as the processor systems, primarily because of the special purpose design which is generally required and the limitations in use of LSI techniques for these systems. However, since processors are programmable, it is possible to implement controller functions with microprocessors by assigning control functions to data signals and programming the microprocessor to perform the required function. Unfortunately, there are two significant problem areas to be encountered when using microprocessors to implement controller functions, and these problem areas are cost and speed.

When implementing controller functions that are not very complex and/or when the controller is going to be produced in low volume, the microprocessor utilizing LSI circuits may not meet cost objectives in view of the large initial investment in providing such LSI circuits. Another consideration in the cost effectiveness of microprocessors is the fact that they are not efficient at bit manipulation, which is a primary task in the controller function. The instructions set in a microprocessor are processor oriented and usually require long, cumbersome routines to effect bit manipulation for control purposes.

The long programs which control the microprocessor increase the amount of memory required, which degrades the cost effectiveness of the system while also contributing to the second problem, the problem of slow speed. The more instructions that are required to cause an output bit to assume a desired state in response to an input signal, the longer the response time of the controller will be. Slow response time and correspondingly low throughput will eliminate the microprocessor from effective use in many applications.

Microcontrollers have been provided which attempt to increase cost effectiveness and throughput, but they have failed to address the problem of bit manipulation. Most microcontrollers are bipolar devices that are basically the working storage and arithmetic and logic unit (ALU) from a microprocessor architecture without the control logic to make it a microprocessor. The microcontroller approach does offer more flexibility and a lower cost chip, but the system cost will remain about the same or higher after the required control logic is added. Also, although bipolar microcontrollers have significantly better throughput than MOS microprocessors, the problems of bit manipulation will eliminate the use of these systems for many applications.

In addressing itself to the abovementioned problems which are inherent in prior microprocessor or microcontroller systems which implement controller functions, the present invention provides a microprogrammed controller using conventional small scale integration or medium scale integration (SSI/MSI) devices to effectively meet the problems of cost effectiveness, speed, and the attendant problem of bit manipulation. The system consists of a double operand single-pass architecture with eight-bit data paths and a sixteen-bit microinstruction which provides the capability of testing, setting, or resetting a single bit in any register with a single microinstruction. A separate adder is provided for address computation in parallel with microinstruction execution.

One of the characteristic features of the present invention is the provision of a feed-back path from the output registers of each of the input-output (I/O) ports associated with the peripheral unit or units and arithmetic and logic unit to the output bus to provide simplified and high-speed bit manipulation, including bit testing, bit setting, and bit resetting using the I/O registers.

Such a microprogrammed controller is particularly effective and efficient in bit manipulation, and provides a very desirable alternative from the point of cost effectiveness to microprocessors and microcontrollers in designs for low volume applications.

It is a main object of the present invention to provide means for implementing programmed logic that is faster than MOS microprocessors, and less expensive, in low quantities, than microprocessors and microcontrollers.

It is a further object of the present invention to provide a microprogrammed controller which is more cost effective, operates at higher speed, and is particularly more efficient at bit manipulation than conventional microprocessors used for controller functions.

Another object of the present invention is to provide a microprogrammed controller of the type described which may be formed of off-the-shelf small scale or medium scale integrated circuit devices.

It is still another object of the present invention to provide a microprogrammed controller of the type described which provides the capability to test, set, or reset a single bit in any register with a single microinstruction.

These and other objects, features, and advantages of the present invention will become more apparent from the following detailed description thereof when taken in conjunction with the accompanying drawings, which illustrate an exemplary embodiment of the present invention, and wherein:

FIG. 3 is a table defining a general purpose set of microinstructions for use in the system of FIG. 2;

Figure 6:
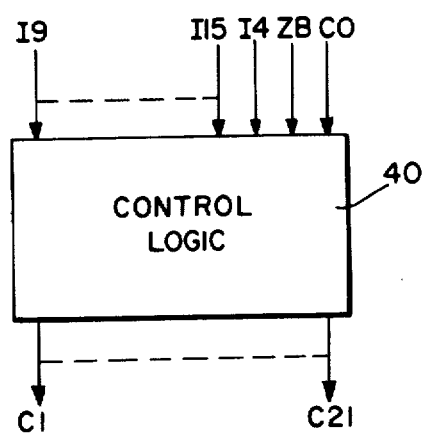
Figure 7:
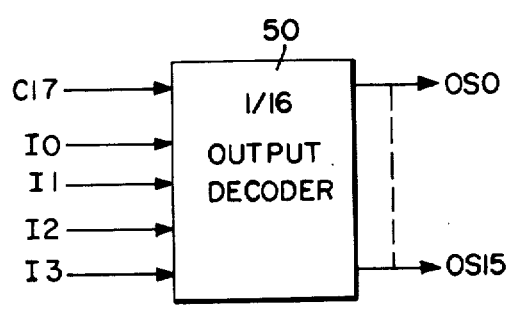
Figure 2:
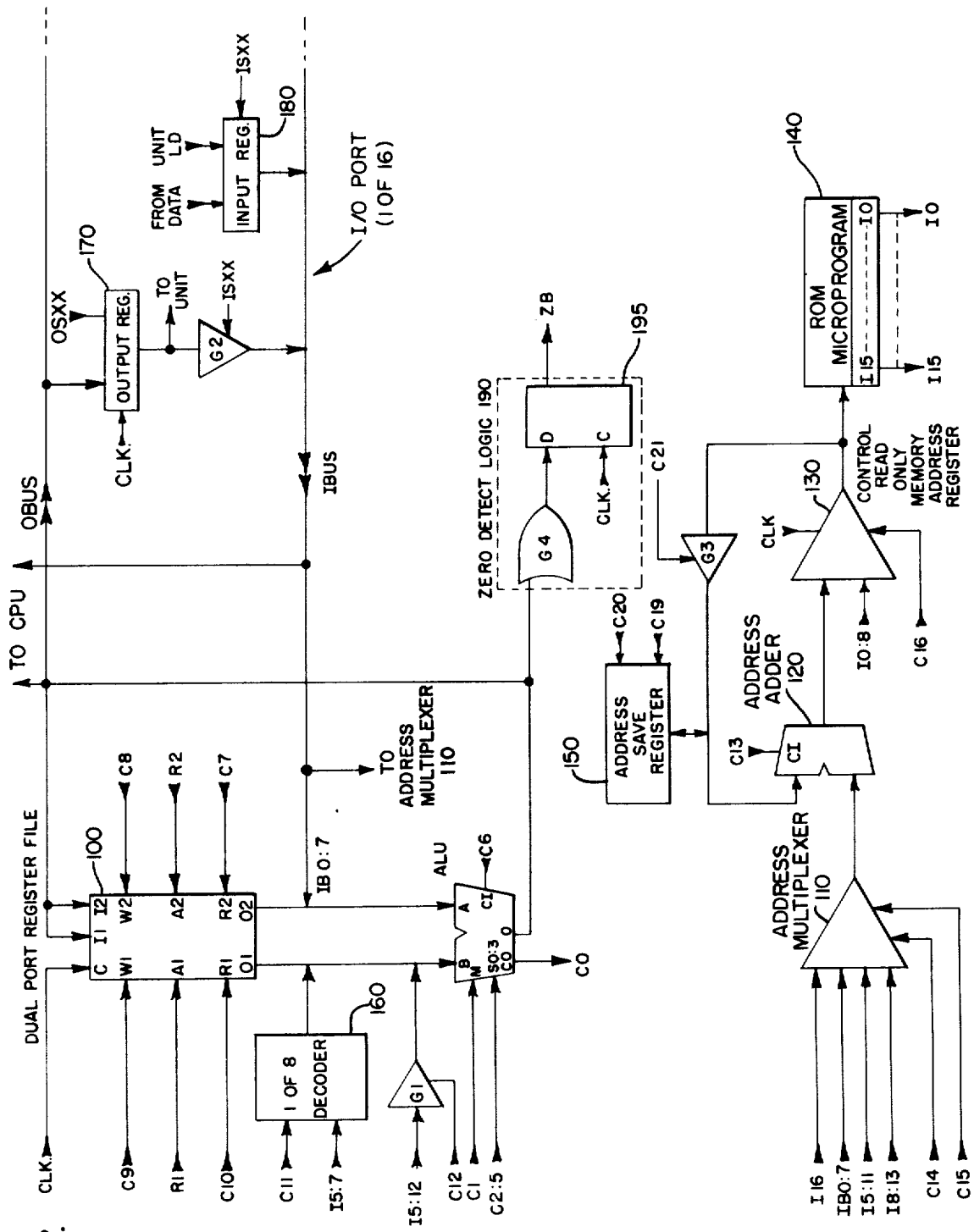
FIG. 2 is a schematic block diagram of the microprogrammed controller in accordance with the present invention.
Figures 4, 5:
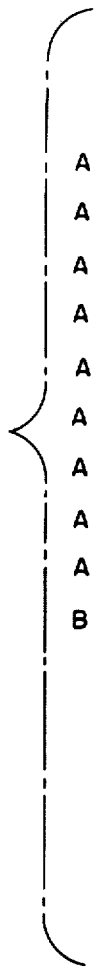

FIG. 4 describing the control signals for the various functions performed by the arithmetic and logic unit in the system of FIG. 2;

FIG. 5 is a table indicating the various control signals associated with the operation of the address multiplexer in the system of FIG. 2;

FIG. 6 is a schematic illustration of the control logic circuit;

FIG. 7 is a schematic illustration of the output select decoder; and

Figure 8:
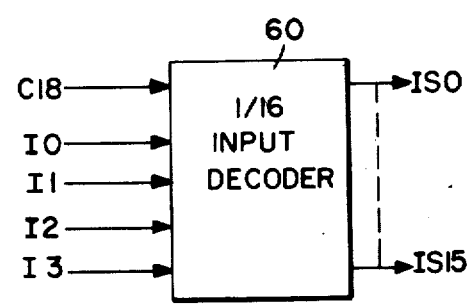

FIG. 8 is a schematic illustration of the input select decoder.

The following detailed description relates to a preferred embodiment of the present invention; however, a full understanding of the basic principles of the invention will clearly indicate that the invention is not limited to the embodiment disclosed and illustrated herein, but has general application in the microcontroller field.

Figure 1:
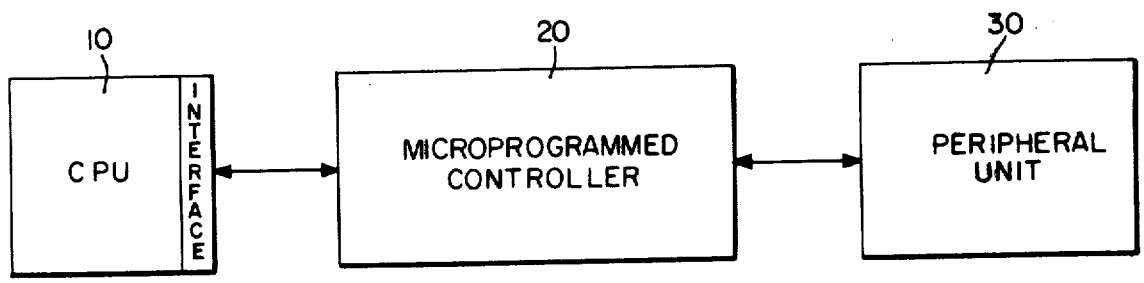
FIG. 1 is a basic block diagram illustrating the general system configuration in accordance with the present invention.

FIG. 1 illustrates the basic concept of this invention in relation to a system including a central processing unit 10 which provides the basic command control signals to one or more peripheral units 30. The central processing unit 10 may take the form of a computer conventional card reader, magnetic tape console, or similar control unit for providing the basic command signals required to control the peripheral units in accordance with a predetermined control process. The control process is implemented in accordance with the instructions received from the central processing unit 10 and the operating conditions as determined from the peripheral unit 30. The provision of these control signals in proper timed sequence from the central processing unit 10 to the peripheral units 30 and the necessary testing and manipulation of these control signals in response to the operating conditions of the peripheral unit 30 are effected in accordance with the present invention by a microprogrammed controller 20.

Normally microprocessors and microcontrollers which are designed primarily for controller functions consist of hand-wired logic structured specially for the particular type of peripheral unit to be controlled. Thus, such microprocessors and microcontrollers lack the flexibility which could be provided by a programmable processing device which permits a changing of the control functions provided thereby by simple reprogramming instead of the altering of hardware. Thus, the present invention provides a novel microprogrammed controller for interconnection between a central processing unit and one or more peripheral units for controlling the transfer of data therebetween in response to instructions from the central processing unit 10.

FIG. 2 is a basic block diagram of the microprogrammed controller 20 in accordance with the present invention. The system provides a double-operand single-pass architecture with eight-bit data paths and is controlled by a sixteen-bit microinstruction, and the controller is advantageously made up of commercially available SSI/MSI devices.

The heart of the microprogrammed controller consists of a control read-only memory 140, which may be implemented with a Harris HPROM 1024 Field Programmable Read-Only Memory. The memory 140 provides a means for storage of the program to be executed and can provide a maximum of 512 sixteen-bit microinstructions. By suitably addressing a particular microinstruction in the memory 140, output instruction signals I0 through I15 are provided to effect control within the system.

Further control within the system is provided by a control logic circuit 40, which as seen in FIG. 6, is responsive to instruction signals I4 and I9 through I15 from the memory 140 as well as further signals ZB and CO to provide the control signals C1 through C21. The control logic 40 provides a means of decoding and controlling the execution of each microinstruction. The control logic can be implemented with random logic in accordance with the following definitions of the control signals C1 through C21 presented in terms of the instruction mnemonics and instruction bits:

$$
\begin{aligned}
C1 =\ & \text{MOVE 1} \lor \text{MOVE 2} \lor \text{AND} \lor \text{OR} \lor \text{XOR} \lor \text{SET BIT} \lor \text{RESET BIT} \lor \\
     & \text{MOVE CONSTANT} \lor \text{MATCH/SKIP} \lor \text{ZERO REGISTER TEST} \lor \\
     & \text{NON-ZERO REGISTER TEST} \lor \text{ZERO BIT TEST} \lor \text{NON-ZERO BIT TEST} \\
 =\ & \{(\overline{I15} \land \overline{I14} \land \overline{I13}) \land [(\overline{I12} \land \overline{I11}) \lor (\overline{I12} \land \overline{I10} \land \overline{I9}) \lor (I12 \land \overline{I11} \land \overline{I10})]\} \\
     & \lor I15 \lor I15 \lor I13 \\
C2 =\ & \text{MOVE 2} \lor \text{AND} \lor \text{ADD} \lor \text{SET BIT} \lor \text{RESET BIT} \lor \text{ZERO REGISTER} \\
     & \text{TEST} \lor \text{NON-ZERO REGISTER TEST} \lor \text{ZERO BIT TEST} \lor \text{NON-ZERO BIT TEST} \\
 =\ & \{(\overline{I15} \land \overline{I14} \land \overline{I13}) \land [(\overline{I12} \land \overline{I11} \land I10 \land \overline{I9}) \lor (\overline{I12} \land \overline{I10} \land I9) \lor \\
     & (I12 \land \overline{I11} \land \overline{I10})]\} \lor I15 \lor (I14 \land I13) \\
C3 =\ & \text{MOVE 1} \lor \text{MOVE 2} \lor \text{AND} \lor \text{OR} \lor \text{XOR} \lor \text{SUB} \lor \text{RESET BIT} \lor \\
     & \text{MOVE CONSTANT} \lor \text{MATCH/SKIP} \lor \text{ZERO REGISTER TEST} \lor \\
     & \text{NON-ZERO REGISTER TEST} \lor \text{ZERO BIT TEST} \lor \text{NON-ZERO BIT TEST} \\
 =\ & \{(\overline{I15} \land \overline{I14} \land \overline{I13}) \land [(\overline{I12} \land \overline{I12} \land \overline{I11}) \land (\overline{I12} \land I10 \land \overline{I9}) \lor (\overline{I11} \land \overline{I10} \land I9)]\} \\
     & \lor I15 \lor I14 \lor I13 \\
C4 =\ & \text{MOVE 2} \lor \text{OR} \lor \text{XOR} \lor \text{SUB} \lor \text{ROTATE} \lor \text{SET BIT} \lor \text{MATCH/SKIP} \lor \\
     & \text{ZERO REGISTER TEST} \lor \text{NON-ZERO REGISTER TEST} \lor \text{ZERO} \\
     & \text{BIT TEST} \lor \text{NON-ZERO BIT TEST}
\end{aligned}
$$

-continued

```
    = {(I15 ∧ I14 ∧ I13) ∧ [(I12 ∧ I11 v I10 ∧ I9) v (I12 ∧ I11 ∧ I9) v
      (I12 ∧ I11 ∧ I10) v (I12 ∧ I11 ∧ I9)]} v I15 v I14
C5  = MOVE 1 v MOVE 2 v AND v OR v ADD v ROTATE v SET BIT v
      REST BIT v MOVE CONSTANT v ZERO REGISTER TEST v
      NON-ZERO REGISTER TEST
    = {(I15 ∧ I14 ∧ I13) ∧ [(I12 ∧ I11) v (I12 ∧ I10 ∧ I9) v (I12 ∧ I11 ∧ I10)]}
      v (I15 ∧ I13)
C6  = SUB v (ROTATE ∧ CO)
    = (I15 ∧ I14 ∧ I13) ∧ [(I12 ∧ I11 ∧ I10 ∧ I9) v (I12 ∧ I11 ∧ I10 ∧ I9 ∧ CO)]
C7  = I4 ∧ (MOVE 1 v MOVE 2 v AND v OR v XOR v ADD v SUB v
      ROTATE v SET BIT v RESET BIT v JUMP RELATIVE v
      MOVE CONSTANT v MATCH/SKIP v ZERO REGISTER TEST v
      NON-REGISTER TEST v ZERO BIT TEST v NON-ZERO BIT TEST)
    = I4 ∧ [{(I15 ∧ I14 ∧ I13) ∧ (I12 ∧ (I10 ∧ I9) ∧ (I12 ∧ I11 ∧ I10)}
      v I15 v I14 v I13]
C8  = I4 ∧ (MOVE 1 v AND v OR v XOR v ADD v SUB v ROTATE v
      SET BIT v RESET BIT v MOVE CONSTANT)
      I4 ∧ [{(I15 ∧ I14 ∧ I13) ∧ [(I12 ∧ I10) v (I12 ∧ I11) v (I12 ∧ I10 ∧ I9) v
      (I12 ∧ I11 ∧ I10)]} v (I15 ∧ I14 ∧ I13)]
C9  = MOVE 2
    = I15 ∧ I14 ∧ I13 ∧ I12 ∧ I11 ∧ I10 ∧ I9
C10 I9 AND ∧ OR ∧ OR ∧ XOR ∧ ADD ∧ SUB
    = (I12 ∧ I11) v (I12 ∧ I11 ∧ I9)
C11 = SET BIT v RESET BIT v ZERO BIT TEST v NON-ZERO BIT TEST
    = (I15 ∧ I14 ∧ I13 ∧ I12 ∧ I11 ∧ I10) v I15
C12 = MOVE CONSTANT v MATCH/SKIP
    = (I15 ∧ I14 ∧ I13) v (I15 ∧ I14 ∧ I13)
C13 = MATCH/SKIP ∧ ZB
    = I15 ∧ I14 ∧ I13 ∧ ZB
C14 = JUMP RELATIVE v (ZERO BIT TEST ∧ ZB) v (NON-ZERO
      BIT TEST ∧ ZB s.7
    = (I15 ∧ I14 ∧ I13 ∧ I12 ∧ I11 ∧ I10 ∧ I9)
C15 = (ZERO REGISTER TEST ∧ ZB) v (NON-ZERO REGISTER TEST ∧ ZB)
      v (ZERO BIT TEST ∧ ZB) v (NON-ZERO BIT TEST ∧ ZB)
    = {(I15 ∧ I14 ∧ I13) ∧ [(I12 ∧ ZB) v (I12 ∧ ZB)]} v (I15 ∧ I14 ∧ ZB)
      v (I15 ∧ I14 ∧ ZB)
C16 = JUMP DIRECT v JUMP TO SUBROUTINE
    = (I15 ∧ I14 ∧ I13) ∧ [(I12 ∧ I11 ∧ I10 ∧ I9) v (I12 ∧ I11 ∧ I10 ∧ I9)]
C17 = I4 ∧ (MOVE 1 v AND v OR v XOR v ADD v SUB v ROTATE v
      SET BIT v RESET BIT v MOVE CONSTANT)
    = I4 ∧ [{(I15 ∧ I14 ∧ I13) ∧ [(I12 ∧ I10) v (I12 ∧ I11) v (I12 ∧ I10 ∧ I9)
      v (I12 ∧ I11 ∧ I10)]} v (I15 ∧ I14 ∧ I13)]
C18 = I4 ∧ (MOVE 1 v MOVE 2 v AND v OR v XOR v ADD v SUB v
      ROTATE v SET BIT v REST BIT v JUMP RELATIVE v
      MOVE CONSTANT v MATCH/SKIP v ZERO REGISTER TEST v
      NON-ZERO REGISTER TEST v ZERO BIT TEST v
      NON-ZERO BIT TEST)
    = I4 ∧ [{(I15 ∧ I14 ∧ I13) ∧ [I12 v (I10 ∧ I9) v I12 ∧ I11 ∧ I10)]} v
      I15 v I14 v I13]
C19 = RETURN
    = I15 ∧ I14 ∧ I13 ∧ I12 ∧ I11 ∧ I10 ∧ I9
C20 = JUMP TO SUBROUTINE
    = I15 ∧ I14 ∧ I13 ∧ I12 ∧ I11 ∧ I10 ∧ I9
C21 = C19
    = I15 v I14 v I13 v I12 v I11 v I10 v I9
```

The memory 140 is addressed by an address selection system which includes an address multiplexer 110, an address adder 120, a control read only memory address register 130, an address save register 150 and a control gate G3. Each of these elements is controlled by predetermined control signals from control logic 40 as will be described.

The particular microprogram within the memory 140 which is to be performed is accessed by the control read-only memory address register 130, which may be implemented by a TI 74298 Quad Two-Input Multiplexer with Storage, manufactured by Texas Instruments. The register 130 is a nine-bit register that holds the current microinstruction address, and is loaded, on the trailing edge of each clock pulse applied thereto, from the output of an address adder 120 or by the direct application thereto of the instruction signals I0 through I8 for effecting a Direct Jump microinstruction. The control signal C16 applied to the register 130 selects between the input from the address adder 120 and the instruction input.

The address multiplexer 110 provides a means of selecting the value to be added to the current value of the control read-only memory address register 130 or the address save register 150 when computing the next address to be accessed in the microprogram read-only memory 140. The address multiplexer 110 may be implemented by a TI 74153 Dual Four Input Multiplexer manufactured by Texas Instruments. One of four inputs may be selected at the address multiplexer 110 in accordance with the values of the control signals C14 and C15 to effect execution of the proper microinstruction, as shown in FIG. 5. The input $1_{16}$ serves to increment the address by one. The inputs IB0 through IB7 are derived from the CPU 10 or the I/O port via the input bus IBUS and provide for a Jump Relative microinstruction. The inputs I5 through I11 derived from the microprogram provide for the Register Test microinstruction, and the signals I8 through I13 from the microprogram provide for the Bit Test microinstruction.

The output from the address multiplexer 110 is applied to one input of the address adder 120, which may be implemented with a TI 7483 four-bit adder of the type manufactured by Texas Instruments. The address adder 120 is provided for address computation in parallel with microinstruction execution and serves to add the output of the address multiplexer to either the address provided by the save register 150 or the current address as received from address register 130. The output of the address adder 120 is applied to the control read-only memory address register 130. The control signal C13 applied to the address adder 120 causes a carry-in signal during a Match microinstruction if the output bus OBUS is not equal to zero.

The address save register 150 is a nine-bit register which provides a means of saving the current address when a Jump To Subroutine microinstruction is executed. The register 150 may be implemented with a National semiconductor DM 8553 eight-bit latch. The control signals C19 and C20 applied to the register 150 provide timing input and output controls for the register.

A transmit gate G3, which may be implemented by a TI 74367 Interface Buffer Gate, serves to apply the output of the register 130 to the address adder 150 for address computation, or to isolate the output of the register 130 from the output of the address save register 150 during a Return microinstruction. Thus, a microprogram in the read-only memory 140 is selected in accordance with the address provided by the control read-only memory address register 130, and this address is provided either from the output of the address adder 120 or directly from the instruction signals I0 through I8 from the memory 140 under control of the control signal C16. The address multiplexer 110 selects one of the four inputs, depending upon the control signals C14 and C15, to be applied to one input of the address adder 120, the other input of which is derived either from the address save register 150 or from the output of the register 130 via the gate G3. In this way, the microprogram instruction signals I0 through I15 are generated to also generate the control signals C1 through C21, and these instruction signals and control signals together with the condition and control signals on the input bus IBUS derived from the peripheral device or the control signals derived from the central processing unit control the functioning of the microprogram controller 20. A general purpose set of microinstructions and the instruction signals provided in association therewith are illustrated in FIG. 3.

A dual port register file 100 provides a working storage area of sixteen, eight-bit registers. The register file 100 may be implemented with a TI 74172 multiple-port register file as manufactured by Texas Instruments. In the alternative, the working storage can be provided as eight, eight-bit registers if a smaller system is desired. The dual port register file 100 allows two separate operands to be read from this register simultaneously with the results of the operation being written back into either one of the operand sources thereof. Addressing of the register file is effected by the R1 and R2 fields of the microinstruction consisting of instruction signals I0 through I4 and I5 through I8, respectively, as seen in FIG. 3. The control signals C7 through C10 from the control logic control (FIG. 6) provides the read/write enable signals for reading data out from the outputs O1 and O2 to an arithmetic and logic unit ALU and to write data into the register file 100 via the inputs I1 and I2 in time with the clock signals applied to input C thereof.

The arithmetic and logic unit ALU provides a means for performing arithmetic and logic functions on the two operands, and may be implemented with a TI 74181 ALU as manufactured by Texas Instruments. The control signals C1 through C6 applied to the arithmetic and logic unit ALU determine the particular operation performed, as seen in FIG. 4. The input to the A side of the ALU is derived from one of the sixteen registers in the register file 100 or consists of data from one of sixteen input-output (I/O) ports connected to the input bus IBUS. The input to the B side of the ALU is one of the sixteen registers in the register file 100, the output of a one-of-eight decoder 160, or the output of a transmit gate G1. The ALU output is connected to the zero detect logic circuit 190, the inputs of the register file 100 and to all input-output ports that are outputs via the output bus OBUS.

Thus, data may be received at the ALU from several sources to effect bit testing, bit manipulation, and other functions required by the microcontroller. Data from an input-output (I/O) port received on the input bus IBUS may be inserted into the dual port register file 100 through the A side of the ALU and may be tested or manipulated in conjunction with the outputs of the decoder 160, the transmit gate G1 or an operand stored in the dual port register file 100. As will be described in greater detail hereinafter, a further important feature of the present invention resides in the ability to perform bit manipulation using the register in the input-output (I/O) port by providing a feedback path from the output register through the input bus IBUS and the ALU.

The one-of-eight decoder 160 provides a means of generating a mask to be used in conjunction with the operand specified by the R2 field of the microinstruction and the ALU to perform the bit test, bit set, and bit reset microinstructions, as seen in FIG. 3. This decoder may be implemented with a TI74 S138 decoder as manufactured by Texas Instruments. The mask provided by the decoder 150 is a field of seven logical "1's" and one logical "0". The logical "0" will be in a bit position determined by the instruction signals I5 through I7 and the ALU operation performed will be [A ∧ B] for bit test and bit reset, and [A ∨ $\overline{B}$] for bit set operations. Control signal C11 enables the output of the one-of-eight decoder at the appropriate time. Thus, bit manipulation may be performed very simply in accordance with the present invention using the decoder 160 in conjunction with the data provided to the ALU from the input bus IBUS or the operand in the dual port register file 100.

The transmit gate G1, which may take the form of a TI 74367 Bus Interface Gate as manufactured by Texas Instruments, provides a means of gating the instruction signals I5 through I12 to the B input of the ALU during instructions utilizing a constant. The control signal from the control logic 40 enables the transmit gate at the appropriate time to supply an appropriate constant, as designated by the applied instruction signals, to the B input of the ALU.

Each input-output port includes an output register 170 connected to the output bus OBUS and an input register 180 connected to the input bus IBUS. The central processing unit CPU is also connected across the input and output buses, and may be considered one of the I/O ports, so as to be effectively in parallel with each of the other input-output ports and the dual port register file 100 to enable the transmitting of control signals to the microprogrammed controller 20 and to the respective peripheral units 30 in accordance with the required control process.

The output register 170 in each input-output port provides a means of outputting data or control signals to a destination external to the microprogrammed controller, and may be implemented with a TI 74173 Bus Buffer Register as manufactured by Texas Instruments or any other suitable known storage device. The information is loaded into the output register at the appropriate time by the coincidence of one of the output select signals OS0 through OS15 derived from the output decoder 50 (FIG. 7) and the clock signals CLK. The output of the output register goes to the external destination, i.e., the peripheral device, and is also gated onto the input bus IBUS at the appropriate time by the proper input enable signal IS0 through IS15 via transmit gate G2. As already noted, the presence of the gate G2 between the output of the register 170 and the input bus IBUS provides a feedback path which facilitates bit manipulation and bit testing. In this way, the output register 170 may be used similar to an internal register facilitating manipulation of the input and output signals. In response to an instruction received from the input register, the digital output is modified bit-by-bit in accordance with internal instructions provided by the microprogram. This is accomplished by accessing the present status of the output operand, comparing it with the desired operand, and modifying the bits to be changed. The desired output is determined by the input signal and the internal instruction provided by the microprogram.

The input register 180 of each input-output port provides a means of inputting data or condition signals from the external source to the microprogrammed controller, and may be provided in the form of any storage device providing tri-state outputs. The external source clocks data into the register independent of the microprogrammed controller and is gated onto the input bus IBUS at the appropriate time by one of the input enable signals IS0 through IS15 provided from the input decoder 60 (FIG. 8). The input register does not, in fact, have to be a register, but may be a tri-state transmit gate or other suitable device, as well known in this art.

The zero detect logic 190 consists of an eight-input OR gate G4 and a "D" flip-flop 195. The output bus OBUS provides the input to the OR gate G4, the output of which is clocked into the flip-flop 195 at the leading edge of the clock pulse CLK applied to the C input of the flip-flop 195. The output of the flip-flop 195 is applied to one input of the control logic 40, as seen in FIG. 6, to be used in computing the next address for the match, zero register test, non-zero register test, zero bit test, and non-zero bit test microinstructions.

The input and output select decoders 50 and 60, as seen in FIGS. 7 and 8, provide the means for selecting the input-output port registers as a destination for the output bus and a source for the input bus. Each of these decoders may be implemented with a TI 74154 decoder, as manufactured by Texas Instruments. A decoder 50 operates in response to the control signal C17 from the control logic 40, while the decoder 60 operates in response to the control signal C18 from the control logic 40.

The variety of functions available in the arithmetic and logic unit ALU combined with the flexible architecture of the microprogrammed controller will permit many different microinstructions to be implemented. The manner in which these functions are performed within the system will be apparent from the general purpose set of microinstructions defined in FIG. 3 in conjunction with the functional states of the arithmetic and logic unit ALU and the address multiplexer 110, as illustrated in FIGS. 4 and 5, along with the foregoing definitions of the various control signals C1 through C21 derived from the control logic 40.

As can be seen, the microcontroller of the present invention provides all of the flexibility of a programmed microprocessor, while also providing for simplified and efficient bit manipulation as required for controller functions, and these objectives have been achieved with a fast response time and at low cost.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A controller circuit for connection to a central processor unit and at least one peripheral unit for controlling the transfer of data therebetween in response to instructions from the central processor unit comprising memory means for storing a plurality of microprograms each consisting of a plurality of microinstruction signals, address means responsive to instructions from said central processing unit for reading out selected microprograms from said memory means, at least one input-output port including input register means for storing data from said peripheral unit and output register means for storing data to be outputted to said peripheral unit, arithmetic means for performing arithmetic and logic functions, first bus means for connecting said input register means to a first input of said arithmetic means, second bus means for connecting the output of said arithmetic means to said output register means, feedback control means for selectively connecting the output of said output register means to said first bus means so as to feed the data being applied to said peripheral unit directly back to said arithmetic means for further processing, said central processor unit being connected to said first and second bus means, and logic control means responsive to selected microinstruction signals from said memory means for providing a plurality of control signals for controlling the operation of said arithmetic means, said input register and output register means, said feedback control means, and said address means.

2. A controller circuit as defined in claim 1, wherein said address means includes address selection means connected to said first bus means and said memory means and responsive to predetermined control signals for selecting a memory address based on one of the outputs received on said first bus means from said input register means, said feedback control means and said central processor unit, as well as the output of said memory means.

3. A controller circuit as defined in claim 2, wherein said address means further includes address register means connected to said memory means for storing the address of a microprogram to be executed and address adder means having one input connected to the output of said address selection means and a second input connected to the output of said address register means, the output of said address adder means being connected to an input of said address register means.

4. A controller circuit as defined in claim 3, wherein said address means further includes address save register means connected between the output of said address register means and said second input of said address adder means for storing an address during the time a jump to subroutine microprogram is executed.

5. A controller circuit as defined in claim 1, wherein said feedback control means comprises gating means responsive to a predetermined control signal for connecting the output of said output register means to said first bus means.

6. A controller circuit as defined in claim 5, further including working storage means for storing data received from said central processor unit and said peripheral unit, means connecting the output of said working storage means to said first input of said arithmetic means in response to selected control signals and means for connecting the output of said arithmetic means to the input of said working storage means in response to further selected control signals.

7. A controller circuit as defined in claim 6, wherein said working storage means provides a plurality of individual storage areas accessed in response to selected microinstruction signals from said memory means.

8. A controller circuit as defined in claim 6, further including means connected to a second input of said arithmetic means for effecting bit manipulation of data signals received from said first bus means in response to selected control signals.

9. A controller circuit as defined in claim 8, wherein said bit manipulation effecting means comprises decoder means for generating a mask signal consisting of a plurality of bits all but one of which has the same binary value and the location of the bit of the other binary value being determined by the applied control signals.

10. A controller circuit as defined in claim 8, further including gating means responsive to a selected control signal for passing predetermined microinstruction signals representing a numerical constant to said second input of said arithmetic means.

11. A controller circuit for interconnection between a central processor unit and at least one peripheral unit for controlling the transfer of data therebetween in response to instructions from the central processor unit comprising control means for providing sets of microinstruction signals corresponding to selected stored microprograms in response to instructions from said central processing unit and condition signals received from said peripheral unit, input register means for storing condition signals received from said peripheral unit, arithmetic means for performing arithmetic and logic functions in response to selected control signals, first means in the form of an input bus for connecting the output of said input register means to the input of said arithmetic means, output register means for storing data signals to be supplied to said peripheral unit, second means in the form of an output bus for connecting the output of said arithmetic means to the input of said output register means, and feedback control means responsive to selected microinstruction signals for directly connecting the output of said output register means to the input of said arithmetic means so as to feed the data being applied to said peripheral unit back to said arithmetic means for further processing.

12. A controller circuit as defined in claim 11, wherein said control means includes memory means for storing said microinstruction signals and address means responsive to instructions from said central processing unit and predetermined microinstruction signals for reading out selected microinstruction signals from said memory means, said address means including address adder means for effecting address computation in parallel with microinstruction execution.

13. A controller circuit as defined in claim 12, wherein same address means further comprises address register means connected between said address adder means and said memory means for storing the address of a microprogram to be executed, and address multiplexer means for controlling said address adder means in response to a selected one of a plurality of address instructions.

14. A controller circuit as defined in claim 11, further including logic control means responsive to selected microinstruction signals from said memory means for providing a plurality of control signals for controlling the operation of said arithmetic means, said input register and output register means, said feedback means, and said address means.

15. A controller circuit as defined in claim 14, wherein said feedback control means comprises gating means responsive to a predetermined control signal for connecting the output of said output register means to said first means.

16. A controller circuit as defined in claim 15, further including means connected to an input of said arithmetic means for effecting bit manipulation of data signals from said first means in response to selected control signals.

17. A controller circuit as defined in claim 16, wherein said bit manipulation effecting means comprises decoder means for generating a mask signal consisting of a plurality of bits all but one of which has the same binary value and the location of the bit of the other binary value being determined by the applied control signals.

18. A controller circuit as defined in claim 16, further including gating means responsive to a selected control signal for passing predetermined microinstruction signals representing a numerical constant to said arithmetic means.

19. A controller circuit as defined in claim 16, further including working storage means for storing data received from said central processor unit and said peripheral unit, means connecting the output of said working storage means to the input of said arithmetic means in response to selected control signals and means for connecting the output of said arithmetic means to the input of said working storage means in response to further selected control signals.

20. A controller circuit as defined in claim 19, wherein said working storage means provides a plurality of individual storage areas accessed in response to selected microinstruction signals from said memory means.

21. A controller circuit for interconnection between a central processor unit and at least one peripheral unit for controlling the transfer of data therebetween in response to instructions from the central processor unit comprising programmable control means for providing control signals in response to condition signals received from said peripheral unit and instructions from said central processing unit, input register means for storing signals received from said peripheral unit, arithmetic means for performing arithmetic and logic functions in response to selected control signals, first means for connecting the output of said input register means to the input of said arithmetic means, output register means for storing data signals to be supplied to said peripheral unit, working storage means for storing data received from said central processor unit and said peripheral unit, the output of said arithmetic means being connected to the input of said working storage means and the input of said output register means, and further means connected to the input of said arithmetic means for effecting bit manipulation of data signals from said first means and said working storage means in response to selected control signals.

22. A controller circuit as defined in claim 21, wherein said control means includes memory means for storing a plurality of microprograms each consisting of a plurality of microinstruction signals and logic control means responsive to selected microinstruction signals for providing a plurality of control signals for controlling said arithmetic means and said input and output register means.

23. A controller circuit as defined in claim 22, wherein said bit manipulation effecting means comprises decoder means for generating a mask signal consisting of a plurality of bits all but one of which has the same binary value and the location of the bit of the other binary value being determined by the applied control signals.

24. A controller circuit as defined in claim 22, further including gating means responsive to a selected control signal for passing predetermined microinstruction signals representing a numerical constant to said arithmetic means.

25. A controller circuit as defined in claim 22, wherein said working storage means provides a plurality of individual storage areas accessed in response to selected microinstruction signals from said memory means.

26. A controller circuit as defined in claim 21, wherein said control means includes memory means for storing said microinstruction signals and address means responsive to instructions from said central processing unit and predetermined microinstruction signals for reading out selected microinstruction signals from said memory means, said address means including address adder means for effecting address computation in parallel with microinstruction execution.

27. A controller circuit as defined in claim 26, wherein said address means further comprises address register means connected between said address adder means and said memory means for storing the address of a microprogram to be executed, and address multiplexer means for controlling said address adder means in response to a selected one of a plurality of address instructions.

28. A controller circuit as defined in claim 22, further comprising feedback control means responsive to selected control signals for connecting the output of said output register means to the input of said arithmetic means via said first means.

* * * * *